United States Patent [19]

Granzow

[11] 4,293,465
[45] Oct. 6, 1981

[54] BIS PHOSPHINE OXIDE FLAME RETARDED, RUBBER-MODIFIED, POLYPHENYLENE ETHER RESIN COMPOSITIONS

[75] Inventor: Albrecht H. Granzow, Somerset, N.J.

[73] Assignee: American Cyanamid Company, Stamford, Conn.

[21] Appl. No.: 78,534

[22] Filed: Sep. 24, 1979

[51] Int. Cl.³ .............................................. C08K 5/51
[52] U.S. Cl. ........................ 260/45.7 P; 260/45.7 PS; 260/45.85 T; 260/45.9 NP; 525/132
[58] Field of Search ................ 260/45.7 P, 45.7 PS, 260/45.9 NP, 45.85 T

[56] References Cited

U.S. PATENT DOCUMENTS 3,284,543  11/1966  Gillham et al. ............ 260/45.7 P
3,976,685  8/1976  Hoffman ...................... 252/8.1
4,009,207  2/1977  Hoffman ..................... 106/18.14
4,101,503  7/1978  Cooper et al. ............... 260/45.7 P Primary Examiner—Harold D. Anderson
Attorney, Agent, or Firm—Bruce F. Jacobs

[57] ABSTRACT

Flame retardant, rubber-modified polyphenylene ether resin compositions are prepared using a phosphine oxide of the formula

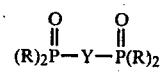

wherein R is cycloalkyl, phenyl, carbamoylethyl or carboalkoxyethyl; and Y is alkylene, substituted xylylene, and bis-(methyl)terephthalate.

8 Claims, No Drawings

BIS PHOSPHINE OXIDE FLAME RETARDED, RUBBER-MODIFIED, POLYPHENYLENE ETHER RESIN COMPOSITIONS

The present invention relates to flame retarded polyphenylene ether resin compositions containing an effective flame retarding amount of a phosphine oxide compound represented by the formula:

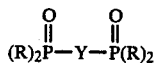

wherein R is selected from cycloalkyl of 5 to 8 carbon atoms; phenyl; carbamoylethyl; and carboalkoxyethyl wherein the alkoxy group contains 1 to 4 carbon atoms; and wherein Y is selected from alkylene containing 1 to 6 carbon atoms; the group,

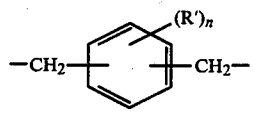

wherein R' is alkyl of 1 to 4 carbon atoms and n is an integer from 1 to 4; or the group,

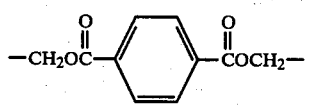

with the proviso that when R is carbalkoxyethyl and Y is

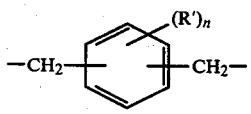

then n is 4.

The compounds of the above formula, which are useful in the present invention, are disclosed in U.S. Pat. Nos. 3,284,543; 3,976,685; 4,009,207; and 4,017,455.

Compounds of the above formula wherein Y is alkylene may be prepared by oxidation of the corresponding bis phosphine compound (see Chatt etal., J. Chem. Soc. 1960, p. 1378, and Hewertson et al., J. Chem. Soc. 1960, p. 1490) with hydrogen peroxide or oxygen; see U.S. Pat. No. 3,032,589 and Berichte 92. 3175 (1954). Alternatively, where R is carbamoylethyl, the corresponding bis (2-cyanoethyl)phosphine oxide is successively hydrolyzed to the carboxylic acid, esterified with a lower aliphatic alcohol, and then amidated with ammonium hydroxide.

Flame retardant, rubber-modified, polyphenylene ether resin compositions are made by incorporating therein an effective flame retarding amount of a compound of the above formula.

The polyphenylene ether resin compositions, suitable for use in the present invention, are described in U.S. Pat. No. 4,024,093 incorporated herein by reference. Basically, these resins comprise about 10 to 90 parts by weight of polyphenylene ether and about 90 to 10 parts by weight of a styrene polymer. Preferably, the polymer contains about 50 to 80 parts by weight of polyphenylene ether and about 50 to 20 parts by weight of styrene polymer. The styrene polymer is a rubber-modified, high-impact polystyrene. The resins are blends of the two polymers, which are mutually soluble and form a homogeneous polymer composition.

The flame retardant compounds are used in an amount sufficient to provide a self-extinguishing composition, as described below. In general, however, the amount used is at least about 4% by weight, based on the weight of resin, preferably about 6% by weight.

The flame retardant compounds may be incorporated into the polymer by any method known in the art for doing so; however, it is preferable to incorporate the compounds by milling into the polymer on a conventional twl-roll mill or by dry blending with the polymer, followed by extrusion.

It is also within the scope of the invention to incorporate such additional ingredients as plasticizers, yes, pigments, heat and light stabilizers, antioxidants, antistatic agents, photochromic materials, and the like.

EXAMPLE 1

Ethylene bis(dicyclohexylphosphine oxide)

Dicyclohexyl phosphine (40 g, 0.2 mole) was reacted with ethylene dibromide (18 g, 0.1 mole) for 2 hours at 90°–100° C. to form ethylenebis(dicyclohexylphosphine). The phosphine compound was then oxidized with 25 g of 30% hydrogen peroxide to give the phosphine oxide. The crude product was recrystallized from isopropanol/water to give 20 grams of the subject compound, m.p. 199°–201° C.

EXAMPLE 2

Bis[(dicyclohexylphosphinyl)methyl]terephthalate

Terephthaloyl chloride (6.1 g, 0.03 mole) in 30 ml benzene was added dropwise to a mixture of dicyclohexyl hydroxymethyl phosphine oxide and triethylamine at 50° C. maximum. The reaction mixture was heated to reflux for 30 minutes and the product was filtered, washed with water and dried; m.p. 226°–228.5° C.

EXAMPLE 3

A total of 10 grams of a blend of 50 parts of polyphenylene ether/50 parts of rubber-modified impact polystyrene, contaning 6% by weight of the compounds shown below, was extruded through a Melt Index Apparatus (described in ASTM D-1238) at 290°–300° C. The cylindrical extrudate, 3–5 inches long and 0.25 inch in diameter, was subjected to the following flammability test, described in Underwriters Laboratories Test UL-94, Vertical Test, Method 3.10–3.15 (September 1973): The polymer specimen, clamped in a vertical position is ignited with a ¾" blue flame (methane or natural gas) for 10 seconds, and the flame is withdrawn. If the flame is extinguished within 25 seconds, the sample is reignited for 10 seconds and the flame again withdrawn. The flame extinguishment time is again recorded. If the flame extinguishment time does not exceed 5 seconds for either flame application, the sample is rated V-O; if the flame extinguishment time for either the first or second flame application is between 5 and 25 seconds, the sample is rated V-1. If a sample shows extinguishment times exceeding 25 seconds for either flame application, it is rated free-burning (FB) and is considered to have failed the test.

The following compounds are rated either V-O or V-1, according to the test, when incorporated into the resin at 6% by weight.

| R | Y |
|---|---|
| 1.  | —CH$_2$CH$_2$— |
| 2.  | —CH$_2$— |
| 3.  | —CH$_2$CH$_2$— |
| 4. H$_2$NCOCH$_2$CH$_2$— | —CH$_2$CH$_2$— |
| 5. H$_2$NCOCH$_2$CH$_2$— | 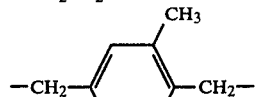 |
| 6. CH$_3$OCOCH$_2$CH$_2$— | 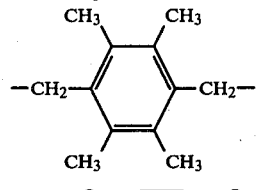 |
| 7.  | 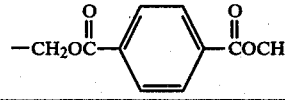 |

EXAMPLE 4

The procedure of Example 3 is repeated except that the blend contains 70 parts of polyphenylene ether resin and 30 parts of polystyrene. When tested at a concentration of 4% by weight, the compounds are rated either V-O or V-1, according to the test.

EXAMPLE 5

Following the procedure of Example 3, a determination was made of the flammability rating of a high-impact polystyrene containing 20% by weight of the compounds identified therein. When determined according to the UL-94 procedure, the specimens were free-burning (FB).

The examples illustrate that (1) for a 50/50 blend of polyphenylene ether resin, the compounds must be used at a concentration of at least 6% by weight to be effective flame retardants; (2) for a 70/30 blend, at least 4% by weight of the compound is required; and (3) the compounds are not effective flame retardants for polystyrene even at a concentration of 20% by weight.

What is claimed is:

1. A flame retardant composition comprising a homogeneous blend of polymers containing about 50 to 80 parts by weight of polyphenylene ether resin, about 50 to 20 parts by weight of a polystyrene, and 6% by weight down to a flame retarding, effective amount of a compound represented by the formula:

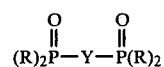

wherein R is selected from the group consisting of cycloalkyl of 5 to 8 carbon atoms, phenyl, carbamoylethyl and carboalkoxyethyl wherein the alkoxy group contains 1 to 4 carbon atoms; and wherein Y is selected from the group consisting of alkylene of 1 to 6 carbon atoms, the group,

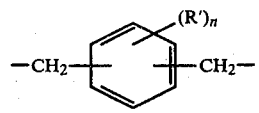

wherein R' is alkyl of 1 to 4 carbon atoms and n is an integer from 1 to 4, or the group,

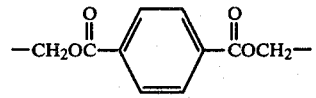

with the proviso that when R is carboalkoxyethyl and Y is

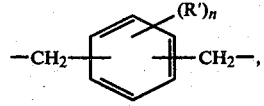

then n is 4.

2. The composition of claim 1 wherein R is phenyl and Y is —CH$_2$CH$_2$—.
3. The composition of claim 1 wherein R is carbamoylethyl and Y is —CH$_2$CH$_2$—.
4. The composition of claim 1 wherein R is cyclohexyl and Y is —CH$_2$CH$_2$—.
5. The composition of claim 1 wherein R is phenyl and Y is —CH$_2$—.
6. The composition of claim 1 wherein R is cyclohexyl and Y is

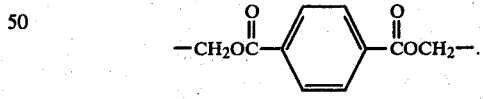

7. The composition of claim 1 wherein the blend is about 70 parts polyphenylene ether and about 30 parts polystyrene, and the phosphine oxide is incorporated in an amount of at least 4% by weight based upon the blend of polymers.

8. The composition of claim 1 wherein the blend is about 50 parts polyphenylene ether and about 50 parts polstyrene, and the phosphine oxide is incorporated in an amount of 6% by weight based upon the blend of polymers.

* * * * *